US011956234B2

(12) United States Patent
Ha et al.

(10) Patent No.: US 11,956,234 B2
(45) Date of Patent: *Apr. 9, 2024

(54) METHOD AND APPARATUS FOR REGISTERING DEVICE IN CLOUD SERVER

(71) Applicant: Samsung Electronics Co., Ltd., Suwon-si (KR)

(72) Inventors: Ji-hun Ha, Seoul (KR); Hee-won Park, Namyangju-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 217 days.

This patent is subject to a terminal disclaimer.

(21) Appl. No.: 17/136,586

(22) Filed: Dec. 29, 2020

(65) Prior Publication Data
US 2021/0119996 A1 Apr. 22, 2021

Related U.S. Application Data

(63) Continuation of application No. 15/827,300, filed on Nov. 30, 2017, now Pat. No. 10,911,448.

(30) Foreign Application Priority Data

Dec. 7, 2016 (KR) .......................... 10-2016-0166215

(51) Int. Cl.
H04L 9/40 (2022.01)
G06F 21/35 (2013.01)
G06F 21/44 (2013.01)
H04W 4/80 (2018.01)
H04W 12/06 (2021.01)
H04W 84/12 (2009.01)

(52) U.S. Cl.
CPC .......... *H04L 63/0884* (2013.01); *G06F 21/35* (2013.01); *G06F 21/44* (2013.01); *H04L 63/0876* (2013.01); *H04W 4/80* (2018.02); *H04W 12/068* (2021.01); *H04W 84/12* (2013.01)

(58) Field of Classification Search
CPC .. H04L 63/0884; H04L 63/0876; H04W 4/80; H04W 12/068; H04W 84/12; G06F 21/35; G06F 21/44
See application file for complete search history.

(56) References Cited

U.S. PATENT DOCUMENTS 8,627,438 B1    1/2014  Bhimanaik
2015/0089624 A1* 3/2015  Kim .................... H04L 63/0876
                                                                 726/9

(Continued)

FOREIGN PATENT DOCUMENTS

KR    10-2016-0045504 A    4/2016

*Primary Examiner* — Alexander Lagor
*Assistant Examiner* — Zoha Piyadehghibi Tafaghodi
(74) *Attorney, Agent, or Firm* — Jefferson IP Law, LLP

(57) ABSTRACT

An apparatus and a method for registering a device in a cloud server are provided. The apparatus includes detecting the device by using short-range communication, requesting an authentication code used for registering the device in the cloud server from an account server in response to the device being detected, receiving the authentication code from the account server, and transmitting the received authentication code and connection address information of the cloud server to the device.

19 Claims, 9 Drawing Sheets

(56) References Cited

U.S. PATENT DOCUMENTS

| | | | |
|---|---|---|---|
| 2015/0128215 A1* | 5/2015 | Son | H04L 63/102 707/827 |
| 2015/0256563 A1* | 9/2015 | Le Guen | H04W 4/70 709/227 |
| 2016/0028737 A1* | 1/2016 | Srinivasan | H04L 63/0807 726/4 |
| 2016/0098870 A1 | 4/2016 | Bergerhoff et al. | |
| 2016/0112268 A1 | 4/2016 | Chung et al. | |
| 2016/0127899 A1 | 5/2016 | Jabara et al. | |
| 2016/0210454 A1* | 7/2016 | Chou | G06F 21/44 |
| 2016/0241999 A1 | 8/2016 | Chin et al. | |
| 2016/0275491 A1 | 9/2016 | Kaladgi et al. | |
| 2016/0286172 A1* | 9/2016 | Weng | H04L 65/1069 |
| 2016/0294925 A1 | 10/2016 | Prashant | |
| 2016/0321447 A1* | 11/2016 | Lancioni | H04W 12/06 |
| 2016/0352729 A1 | 12/2016 | Malik | |

\* cited by examiner

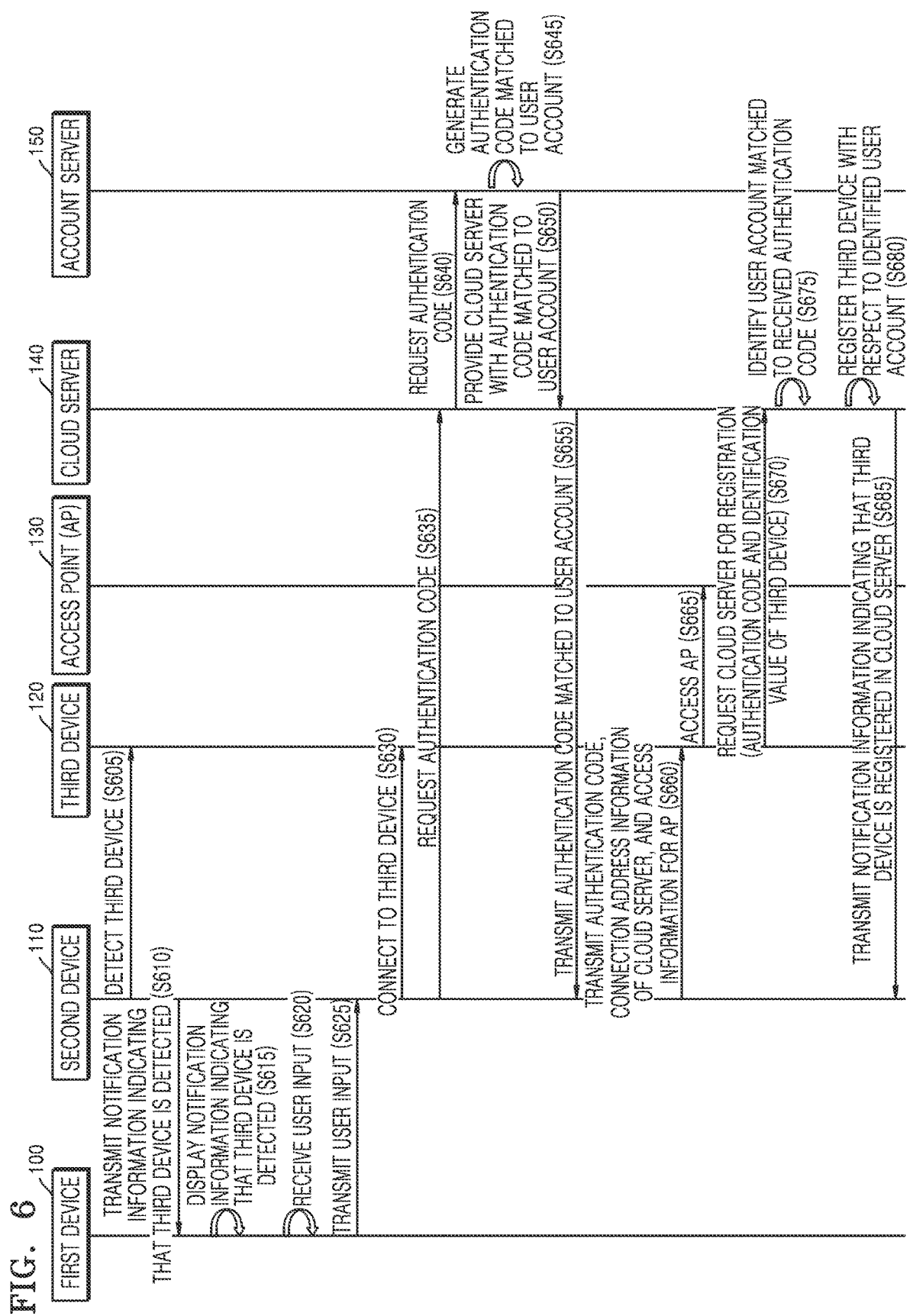

METHOD AND APPARATUS FOR REGISTERING DEVICE IN CLOUD SERVER

CROSS-REFERENCE TO RELATED APPLICATION(S)

This application is a continuation application of prior application Ser. No. 15/827,300, filed on Nov. 30, 2017, and claimed the benefit under 35 U.S.C. § 119(a) of a Korean patent application filed on Dec. 7, 2016 in the Korean Intellectual Property Office and assigned Serial number 10-2016-0166215, the entire disclosure of which is hereby incorporated by reference.

TECHNICAL FIELD

The present disclosure relates to methods and apparatuses for registering a device in a cloud server.

BACKGROUND

As Internet of Things (IoT) technologies and network technologies are developed, home appliances such as mobile devices, televisions (TVs), refrigerators, washing machines, and air conditioners in the home are connected to each other in various ways to provide an environment for sharing information.

Meanwhile, when a user registers a newly purchased home appliance in a network, many actions are required such as device search, input of user account information, input of access information to access an access point (AP), and the like. In a situation where the number of devices that can be connected to the network is increasing rapidly, more actions may be required by a user. Thus, there is a need for a method of easily registering home appliances in a network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and apparatuses for registering devices in a cloud server.

Additional aspects will be set forth in part in the description which follows and, in part, will be apparent from the description, or may be learned by practice of the presented example embodiments.

In accordance with an aspect of the present disclosure, a method of registering a second device in a cloud server on a first device is provided. The method includes detecting the second device by using short-range communication, requesting an authentication code used for registering the second device in the cloud server from an account server in response to the second device being detected, receiving the authentication code from the account server, and transmitting the received authentication code and connection address information of the cloud server to the second device, wherein the received authentication code is matched to a user account of the first device for the account server.

A non-transitory computer-readable recording medium having recorded thereon one or more programs including instructions executes the method according to any one of example embodiments.

In accordance with another aspect of the present disclosure, a first device is provided. The first device includes a memory configured to store at least one program including instructions, at least one communication interface configured exchange data with a second device, an account server, and a cloud server, and a processor, when executing the instructions, is configured to register the second device in the cloud server by detecting the second device by using short-range communication, requesting an authentication code used for registering the second device in the cloud server from an account server in response to the second device being detected, receiving the authentication code from the account server, and transmitting the received authentication code and connection address information of the cloud server to the second device, wherein the received authentication code is matched to a user account of the first device for the account server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a flowchart of a method of registering a third device in a cloud server on a second device by using an authentication code obtained from the cloud server according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present specification, the terms such as "comprise" or "include" should not be construed as necessarily including various elements or processes described in the specification, and it should be construed that some of the elements or the processes may not be included, or additional elements or processes may be further included.

It will be understood that, although the terms first, second, etc. may be used herein to describe various elements, these elements should not be limited by these terms. These terms are only used to distinguish one element from another.

Since the example embodiments are related to methods and apparatuses for registering devices in a cloud server, a detailed description of matters obvious to those of ordinary skill in the art will not be given herein.

Figure 1:
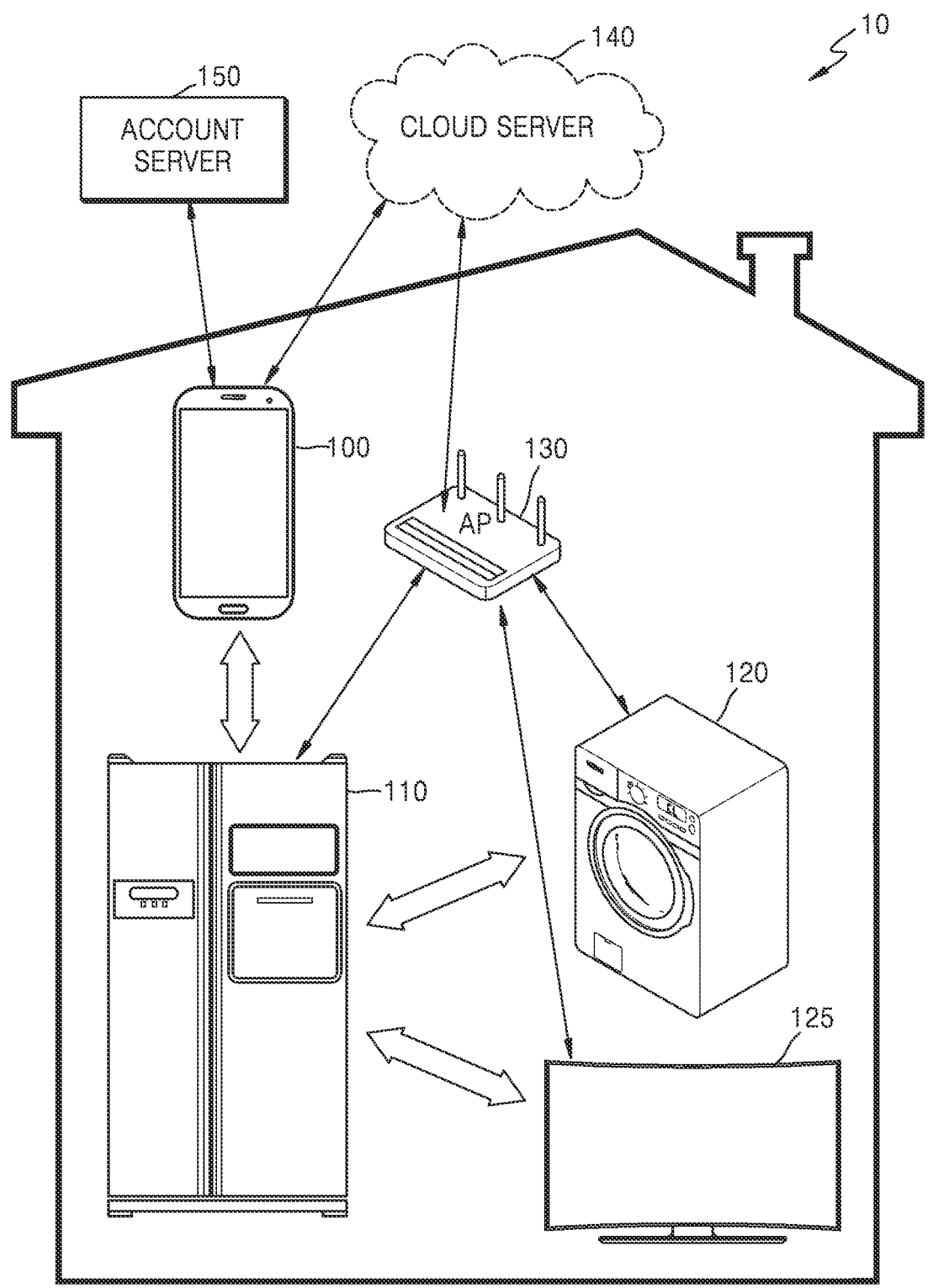
FIG. 1 a schematic view of a system for registering a device in a cloud server according to an embodiment of the present disclosure.

FIG. 1 a schematic view of a system 10 for registering a device in a cloud server 140, according to an embodiment of the present disclosure.

Referring to FIG. 1, the system 10 for registering devices in the cloud server 140 according to an example embodiment may include at least one first device 100, a second device 110, third devices 120 and 125, an access point (AP) 130, a cloud server 140, and an account server 150.

The first device 100 may be an electronic device capable of transmitting and receiving data through wired or wireless communication with another device. For example, the first device 100 may include a smart phone, a tablet, a personal computer (PC), a personal digital assistant (PDA), a smart television (TV), or a portable multimedia player (PMP). Although FIG. 1 illustrates that the first device 100 is a smartphone, this is merely an example and the first device 100 is not limited thereto.

The first device 100 may include a user input unit and a display, and may provide a user interface. The first device 100 may receive a service set identifier (SSID) and a password of the AP 130 through the user interface. Also, the first device 100 may receive user account information through the user interface. The first device 100 may access the AP 130 using the received information, request the cloud server 140 for registration, and log in to the account server 150.

The first device 100 may be easily set up by a user. The easy set-up operation may be collectively referred to as a procedure of accessing a device via the AP 130 and registering the device in the cloud server 140 with respect to a user account. The first device 100 may be accessed via the AP 130 by a user and connected to the Internet, and may be registered in the cloud server 140 by the user.

The first device 100 that is easily set up by a user may easily set up other devices. For example, the first device 100 may perform an easy set-up operation on the second device 110. A method of easily setting up the second device 110 on the first device 100 will be described in detail later below with reference to FIG. 2.

The second device 110 refers to an electronic device capable of transmitting and receiving data through wired or wireless communication with another device. For example, the second device 110 may include a smart phone, a tablet, a PC, a PDA, a smart TV, or a PMP.

Figure 2:
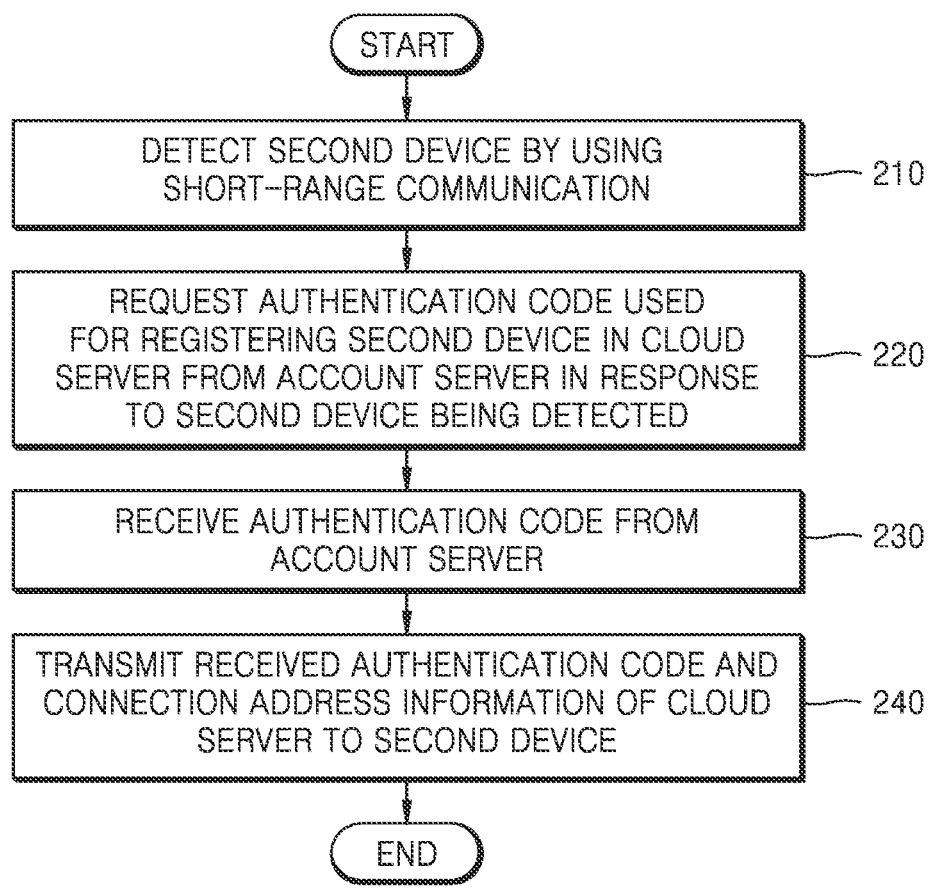
FIG. 2 is a flowchart of a method of registering a second device in a cloud server on a first device according to an embodiment of the present disclosure.

Also, the second device 110 may include home appliances such as a refrigerator, a washing machine, an air conditioner, a vacuum cleaner, a microwave oven, an oven, and the like. In an example embodiment, the second device 110 may be a home appliance that does not provide a user interface. Although FIG. 2 illustrates that the second device 110 is a refrigerator, this is merely an example and the second device 110 is not limited thereto.

The first device 100 may transmit access information for accessing the AP 130 to the second device 110. The second device 110 may access the AP 130 using the access information received from the first device 100. The second device 110 may be connected to the Internet by accessing the AP 130.

Also, the first device 100 may transmit information used for registering the second device 110 to the cloud server 140, to the second device 110. The second device 110 may request the cloud server 140 for registration using the received information.

The first device 100 that is easily set up by a user may automatically easily set up the second device 110 to minimize a user's intervention to easily set up the second device 110.

The second device 110 that is easily set up by the first device 100 may continue to easily set up other devices. For example, the second device 110 may easily set up the third devices 120 and 125. A method of easily setting up the third devices 120 and 125 on the second device 110 will be described in detail later below with reference to FIG. 5B.

The third devices 120 and 125 are electronic devices capable of transmitting and receiving data through wired or wireless communication with other devices. For example, the third devices 120 and 125 may include a smart phone, a tablet, a PC, a PDA, a smart TV, or a PMP.

Also, the third devices 120 and 125 may include home appliances such as a refrigerator, a washing machine, an air conditioner, a vacuum cleaner, a microwave oven, an oven, and the like. In an example embodiment, the third devices 120 and 125 may be home appliances that do not provide a user interface. Although FIG. 1 illustrates that the third devices 120 and 125 respectively are a washing machine and a smart TV, this is merely an example and the third devices 120 and 125 are not limited thereto.

The second device 110 that is easily set up by the first device 100 may automatically easily set up the third devices 120 and 125 to minimize a user's intervention to easily set up the third devices 120 and 125.

The AP 130 refers to a device that enables a device capable of wireless communication to be connected to a network. For example, the AP 130 may be a wireless fidelity (Wi-Fi) AP that enables connection to a network through Wi-Fi communication. Devices connected to the Internet through the AP 130 may access the cloud server 140. Devices in the home may access one AP to form a network.

The cloud server 140 may be a server that provides a cloud service. The cloud service refers to a service that stores user content such as documents, music, and photographs in the cloud server 140 and may download the user content from a device such as a smart phone or upload the user content to the cloud server 140. In addition, a plurality of devices registered in the cloud server 140 may transmit and receive data with each other via the Internet. The plurality of devices registered in the cloud server 140 may be mutually controlled.

The account server 150 may be a server that manages a user account. For example, the account server 150 may be a server that provides a social networking service (SNS), such as Facebook, GitHub, and the like. Devices may be integrally managed using a user account provided by the account server 150. Devices registered with respect to an identical user account may form one network. For example, when a user ID of a user A is 'AAA@BBB.com', a smartphone, a refrigerator, a washing machine, a smart TV, etc. of the user A may be registered in the cloud server 140 or the account server 150 with respect to the user ID 'AAA@BBB.com'.

The first device 100 that is easily set up by a user in the system 10 of FIG. 1 registers the second device 110 in the cloud server 140 and the second device 110 continues to register the third devices 120 and 125 in the cloud server 140 so that a user's intervention required to register devices in the cloud server 140 may be minimized.

FIG. 2 is a flowchart of a method of registering the second device 110 in a cloud server on the first device 100, according to an embodiment of the present disclosure.

Referring to FIG. 2, in operation 210, the first device 100 may detect the second device 110 using short-range communication. The first device 100 may detect the second device 110 to register the second device 110 newly added to the home in the cloud server 140.

The short-range communication according to an example embodiment may include, but is not limited to, Wi-Fi, Bluetooth (BT), ZigBee, Wi-Fi direct (WFD), ultra-wideband (UWB), infrared data association (IrDA), BT low energy (BLE), near field communication (NFC), and Ant+.

In an example embodiment, the first device 100 may receive a Wi-Fi beacon broadcasted from the second device 110 when the short-range communication is Wi-Fi. The second device 110 may generate a soft Wi-Fi AP to obtain information needed to be registered in the cloud server 140. The soft Wi-Fi AP may mean that a device itself acts as a Wi-Fi AP.

The Wi-Fi beacon broadcasted from the second device 110 may include information used for connection to the second device 110 using Wi-Fi communication. For example, the Wi-Fi beacon may include an SSID of the second device 110.

The first device 100 may detect the second device 110 based on information included in the received Wi-Fi beacon. For example, the first device 100 may confirm the SSID of the second device 110 included in the Wi-Fi beacon and detect that the second device 110 is the device newly added to the home. The SSID of the second device 110 may be determined according to a certain rule to indicate that the second device 110 is the device newly added to the home. For example, a device having an SSID including "[OCF Device]" may be a device newly added to the home.

Also, in an example embodiment, the first device 100 may display notification information indicating that the second device 110 is detected on a screen of the first device 100 in response to the second device 110 being detected. The first device 100 may display the notification information on the screen of the first device 100 in order to obtain user consent to register the second device 110 in the cloud server 140.

The first device 100 may receive a user input. In an example embodiment, the first device 100 may receive a user input to register the second device 110 in the cloud server 140. Furthermore, for example, the first device 100 may receive access information for accessing the AP 130 and a user input for inputting user account information. The access information for accessing the AP 130 may include an SSID and a password of the AP 130, and the user account information may include a user ID and a password.

The first device 100 may be connected to the second device 110 based on the user input. For example, if the short-range communication is Wi-Fi, the first device 100 may be connected to the second device 110 by accessing the soft Wi-Fi AP generated by the second device 110. The first device 100 may be connected to the second device 110 according to a user input corresponding to the user consent on the registration of the second device 110 in the cloud server 140 and may register the second device 110 in the cloud server 140.

In operation 220, the first device 100 may request an authentication code used for registering the second device 110 in the cloud server 140 from the account server 150 in response to the second device 110 being detected.

In an example embodiment, the first device 100 may log in to the account server 150. The first device 100 may receive a user input for inputting user account information and log in to the account server 150 using the received user account information. The first device 100 logged in the account server 150 with respect to a user account may request an authentication code from the account server 150.

The account server 150 may generate an authentication code upon the request of the first device 100. The generated authentication code may be matched to the user account of the first device 100 for the account server 150. The authentication code may be used to authenticate that a user of the second device 110 is the same as a user of the first device 100. The authentication code may be used to register the second device 110 in the cloud server 140 with respect to the same user account as that of the first device 100.

Furthermore, in an example embodiment, the first device 100 may transmit access information to the second device 110 for accessing the AP 130 within a proximity from the first device 100 in response to the second device 110 being detected. Since the second device 110 needs to first be connected to the Internet in order to be registered in the cloud server 140, the first device 100 may transmit the access information to the second device 110 for accessing the AP 130 within the proximity from the first device 100. The access information for accessing the AP 130 may include an SSID and a password of a Wi-Fi AP.

In an example embodiment, the first device 100 may currently access the AP 130 within the proximity from the first device 100. The first device 100 may transmit access information on the AP 130 that the first device 100 is currently accessing to the second device 110. In another example embodiment, the first device 100 may receive a user input for inputting access information for accessing the AP 130, and may transmit the received access information to the second device 110. The access information transmitted to the second device 110 may be used by the second device 110 to access the AP 130.

In operation 230, the first device 100 may receive the authentication code from the account server 150. The first device 100 may receive the authentication code matched to a user account of the first device 100 from the account server 150.

In operation 240, the first device 100 may transmit the received authentication code and connection address information of the cloud server 140 to the second device 110. The connection address information of the cloud server 140 may be information on an address of the cloud server 140 in which the first device 100 is registered to match the user account. The second device 110 may access the cloud server 140 using address access information of the cloud server 140 and may request the cloud server 140 for registration using the authentication code.

The first device 100 transmits the authentication code received from the account server 150 instead of transmitting the user account information to the second device 110 so that the second device 110 may be registered in the cloud server 140 with respect to the same user account as that of the first device 100.

The authentication code provided to the second device 110 may be transmitted from the second device 110 to the cloud server 140. The user account matched to the authentication code is identified by the cloud server 140 so that the second device 110 may be registered in the cloud server 140 with respect to the same user account as that of the first device 100.

In an example embodiment, the authentication code matched to the user account may be shared between the account server 150 and the cloud server 140. For example, the authentication code matched to the user account may be generated by the account server 150 and provided to the cloud server 140. The cloud server 140 may identify the user account matched to the authentication code by comparing the authentication code received from the account server 150 with the authentication code received from the second device 110.

The authentication code matched to the user account may be used to register the second device 110 in the cloud server 140 with respect to the same user account as the user account of the first device 100 instead of the user account information.

In an example embodiment, the first device 100 may receive notification information indicating that the second device 110 is registered from the cloud server 140. Also, the first device 100 may display the received notification information on a screen of the first device 100. A user may confirm that the second device 110 is registered in the cloud server 140 through the displayed notification information.

As described above, the first device 100 automatically provides the second device 110 with access information for accessing the AP 130 and information used for the registration in the cloud server 140 so that the second device 110 may be registered in the cloud server 140 with respect to the same user account as that of the first device 100. In the above-described process, only user's minimum consent is required, and user convenience may be increased.

Figure 3:
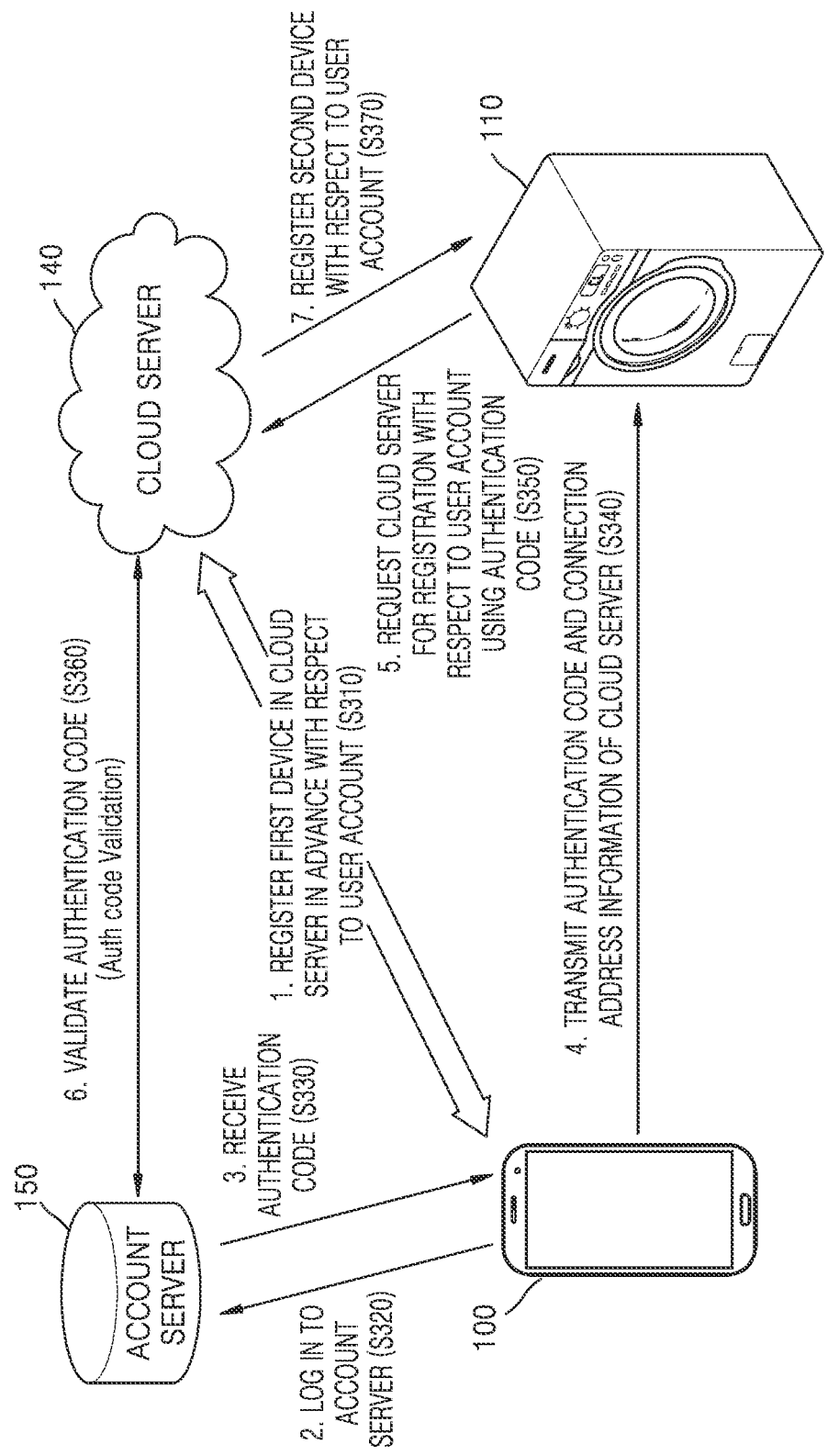
FIG. 3 is a schematic view of a system in which a first device registers a second device in a cloud server using user account information registered in an account server according to an embodiment of the present disclosure.

FIG. 3 is a schematic view of a system in which the first device 100 registers the second device 110 in the cloud server 140 using user account information registered in an account server, according to an embodiment of the present disclosure.

In operation S310, the first device 100 may be registered in the cloud server 140 in advance with respect to a user account. The user account registered in the cloud server 140 is the same as the user account of the first device 100 for the account server 150. When the first device 100 is registered in the cloud server 140, a user account managed by the account server 150 may be used. Although FIG. 3 illustrates that the first device 100 is a smartphone, this is merely an example and the first device 100 is not limited thereto.

In operation S320, the first device 100 may log in to the account server 150 using the user account information. The first device 100 may receive a user input for inputting user account information and log in to the account server 150 using the received user account information.

In operation S330, the first device 100 may receive an authentication code matched to the user account from the account server 150. The authentication code matched to the user account may be used to register the second device 110 in the cloud server 140.

In operation S340, the first device 100 may transmit the received authentication code and connection address information of the cloud server 140 to the second device 110. The first device 100 may induce the second device 110 to be registered in the cloud server 140 without a user's intervention.

In operation S350, the second device 110 may request the cloud server 140 for registration with respect to the same user account as that of the first device 100 using the authentication code received from the first device 100. Although FIG. 3 illustrates that the second device 110 is a washing machine, this is merely an example and the second device 110 is not limited thereto.

In operation S360, the cloud server 140 may validate the authentication code received from the second device 110. The cloud server 140 compares the authentication code received from the second device 110 with the authentication code provided from the account server 150 so that the cloud server 140 may validate whether the second device 110 is a device managed by the same user account as that of the first device 100.

Meanwhile, authentication code verification may be performed by the account server 150. The account server 150 receives the authentication code transmitted from the second device 110 from the cloud server 140 and compares the authentication code received from the cloud server 140 with the authentication code generated by the account server 150 so that the account server 150 may validate whether the second device 110 is a device having the same user account as that of the first device 100. The cloud server 140 may receive a verification result from the account server 150.

In operation S370, the cloud server 140 may register the second device 110 with respect to a user account. The cloud server 140 may register the second device 110 with respect to the same user account as that of the first device 100 by identifying the user account matched to the authentication code.

According to the above-described operations, the second device 110 may be registered with respect to the same user account as that of the first device 100 in the cloud server 140 without a user's intervention. Therefore, user convenience may be increased.

Figure 4:
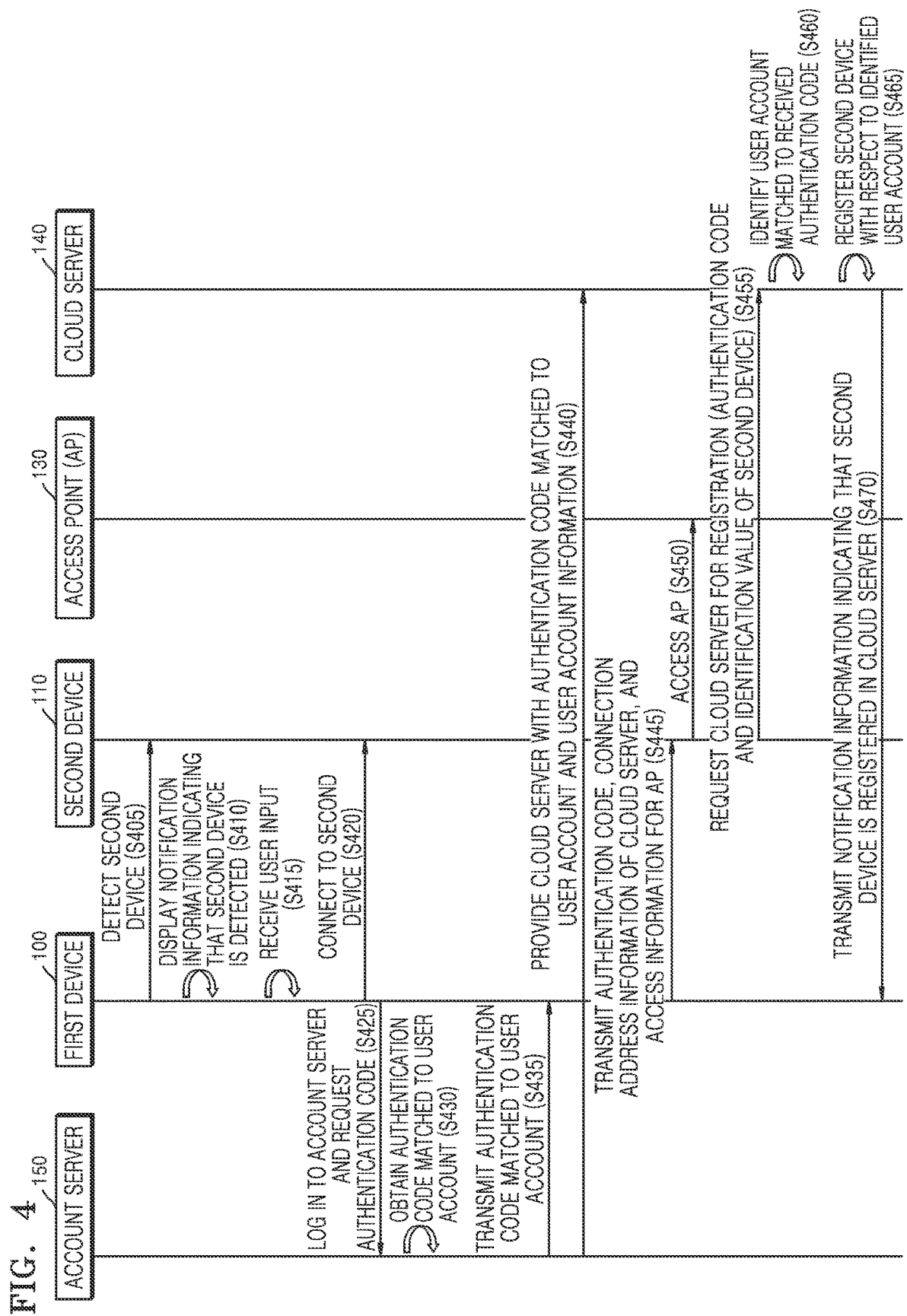
FIG. 4 is a flowchart of a method of registering a second device in a cloud server on a first device by using user account information registered in an account server and an authentication code obtained from the account server according to an embodiment of the present disclosure.

FIG. 4 is a flowchart of a method of registering the second device 110 in the cloud server 140 on the first device 100 by using user account information registered in the account server 150 and an authentication code obtained from the account server 150, according to an embodiment of the present disclosure.

In operation S405, the first device 100 may detect the second device 110 newly added to the home. In operation S410, the first device 100 may display notification information indicating that the second device 110 is detected on a screen of the first device 100 in response to the second device 110 being detected.

In operation S415, the first device 100 may receive a user input. The first device 100 may receive a user input to register the second device 110 in the cloud server 140. A user input corresponding to user consent may be a user's minimum intervention required to register the second device 110 in the cloud server 140.

In operation S420, the first device 100 may be connected to the second device 110 based on the user input. In operation S425, the first device 100 may log in to the account server 150 using the user account information and may request an authentication code from the account server 150.

In operation S430, the account server 150 may obtain an authentication code matched to a user account. For example, the account server 150 may newly generate an authentication code matched to a user account, extract a previously stored authentication code, and receive an authentication code from the outside. The account server 150 may generate and provide the authentication code matched to a user account, thereby not providing the user account information directly. The account server 150 may manage a plurality of devices having an identical user account using the authentication code.

In operation S435, the account server 150 may transmit the authentication code matched to the user account to the first device 100. In addition, in operation S440, the account server 150 may provide the cloud server 140 with the authentication code matched to the user account and the user account information. The authentication code provided to the cloud server 140 may be used to identify a user account of the second device 110 after the cloud server 140 receives the authentication code from the second device 110.

However, operation S440 may be performed any time after operation S430 has been performed. For example, after the cloud server 140 receives a registration request for the cloud server 140 from the second device 110, operation S440 may be performed at the request of the cloud server 140.

In operation S445, the first device 100 may transmit the authentication code, the connection address information of the cloud server 140, and the access information for accessing the AP 130 to the second device 110. However, the access information for accessing the AP 130 may not necessarily be transmitted.

In operation S450, the second device 110 may access the AP 130 using the received access information for accessing the AP 130. The second device 110 may be connected to the Internet through the AP 130. If the access information for accessing the AP 130 has not been transmitted, operation S450 may be omitted.

In operation S455, the second device 110 may request the cloud server 140 for registration. The second device 110 may access the cloud server 140 using the received connection address information of the cloud server 140. Also, the second device 110 may request the cloud server 140 for registration by transmitting the received authentication code and an identification value of the second device 110 to the cloud server 140.

In operation S460, the cloud server 140 may identify a user account matched to the received authentication code. The cloud server 140 may confirm that the second device 110 is managed by the same user account as that of the first device 100 by identifying the user account matched to the received authentication code.

In operation S465, the cloud server 140 may register the second device 110 with respect to the identified user account. The cloud server 140 may integrally manage the first device 100 and the second device 110 by registering the first device 100 and the second device 110 with respect to an identical user account.

In operation S470, the cloud server 140 may transmit notification information indicating that the second device 110 is registered in the cloud server 140, to the first device 100.

According to the above-described operations, a method of integrally managing a plurality of devices based on a user account through the cloud server 140 may be provided. For example, the second device 110 registered in the cloud server 140 by the first device 100 may be remotely controlled by a third device registered in the cloud server 140 with respect to a user account.

Also, since registration of a plurality of devices in the cloud server 140 is automatically performed, actions required by the user to form a network including the plurality of devices may be reduced. As a result, user convenience may be increased.

Figure 5A:
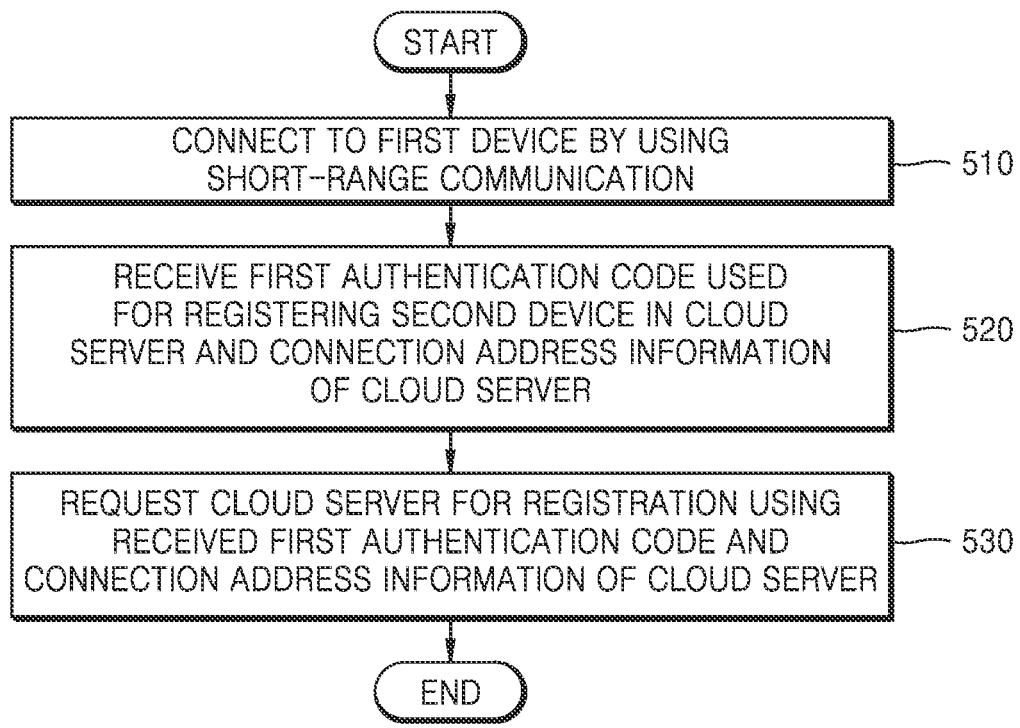
FIG. 5A is a flowchart of a method of a second device requesting registration in a cloud server according to an embodiment of the present disclosure.

FIG. 5A is a flowchart of a method of requesting registration in the cloud server 140 on the second device 110, according to an embodiment of the present disclosure.

Referring to FIG. 5A, in operation 510, the second device 110 may be connected to the first device 100 using short-range communication. The second device 110 may be detected by the first device 100 using short-range communication and may be connected to the first device 100.

In an example embodiment, if the short-range communication is Wi-Fi, the second device 110 may generate a soft Wi-Fi AP to obtain information for requesting registration from the cloud server 140. The soft Wi-Fi AP means that a device itself acts as a Wi-Fi AP.

The second device 110 may be a soft Wi-Fi AP and may broadcast a Wi-Fi beacon. The Wi-Fi beacon broadcasted from the second device 110 may include information used for connection to the second device 110 using Wi-Fi communication. For example, the Wi-Fi beacon may include an SSID of the second device 110.

The SSID of the second device 110 may be determined according to a certain rule to indicate that the second device 110 is the device newly added to the home. For example, a device having an SSID including "[OCF Device]" may be a device newly added to the home. The first device 100 may confirm the SSID of the second device 110 included in the Wi-Fi beacon and detect that the second device 110 is the device newly added to the home.

In operation 520, the second device 110 may receive a first authentication code used for registering the second device 110 in the cloud server 140 and connection address information of the cloud server 140 from the first device 100. The connection address information of the cloud server 140 may be information on an access address of the cloud server 140 in which the first device 100 is registered with respect to a user account.

In an example embodiment, the first authentication code may be an authentication code generated by the account server 150 in response to a request from the first device 100. The first authentication code may be matched to the user account of the first device 100 for the account server 150. The authentication code may be used to authenticate that a user of the second device 110 is the same as a user of the first device 100. The authentication code may be used to cause the second device 110 to be registered in the cloud server 140 with respect to the same user account as that of the first device 100.

Also, in an example embodiment, the second device 110 may receive access information from the first device 100 for accessing the AP 130 within a proximity from the first device 100. Since the second device 110 needs to first be connected to the Internet in order to be registered in the cloud server 140, the second device 110 may receive the access information for accessing the AP 130 within the proximity from the first device 100.

In an example embodiment, the first device 100 may currently access the AP 130 within the proximity from the first device 100. The second device 110 may receive the access information for accessing the AP 130 that the first device 100 is currently accessing from the first device 100. In another example embodiment, the first device 100 may receive access information for accessing the AP 130 from the outside. The second device 110 may receive the access information for accessing the AP 130 that is received from the outside by the first device 100, from the first device 100.

The second device 110 may access the AP 130 using the access information received from the first device 100. The second device 110 may be connected to the Internet by accessing the AP 130. If the short distance communication with the first device 100 is Wi-Fi, the second device 110 may remove the generated soft Wi-Fi AP and access the AP 130 using the received access information.

In operation 530, the second device 110 may request the cloud server 140 for registration using the received first authentication code and the connection address information of the cloud server 140. The second device 110 may access the cloud server 140 using the connection address information of the cloud server 140 and may request the cloud server 140 for registration using the first authentication code.

The second device 110 may request the cloud server 140 for registration with respect to the same user account as that of the first device 100 by receiving the first authentication code instead of the user account information from the first device 100. The second device 110 may transmit the first authentication code to the cloud server 140. A user account matched to the first authentication code is identified by the cloud server 140 so that the second device 110 may be registered in the cloud server 140 with respect to the same user account as that of the first device 100.

As described above, the second device 110 automatically receives the access information for accessing the AP 130 and information used for the registration in the cloud server 140 so that the second device 110 may be registered in the cloud server 140 with respect to the same user account as that of the first device 100. In the above-described process, only user's minimum consent is required, and user convenience may be increased.

Figure 5B:
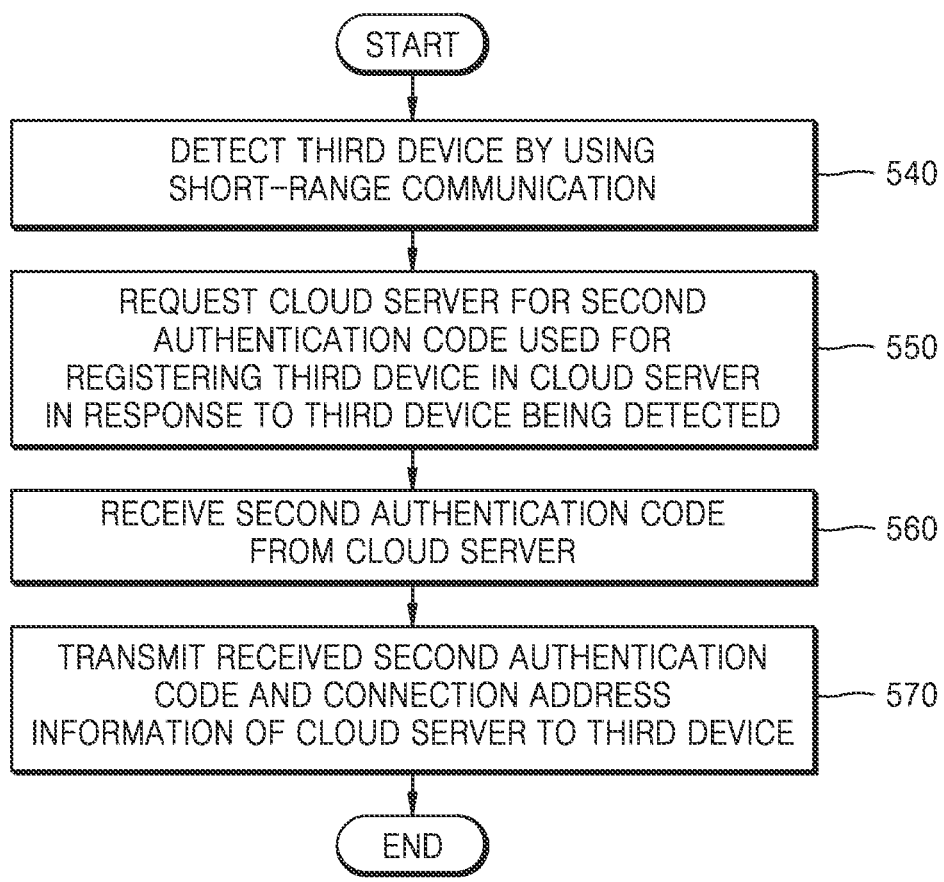
FIG. 5B is a flowchart of a method of registering a third device in a cloud server on a second device according to an embodiment of the present disclosure.

FIG. 5B is a flowchart of a method of registering a third device 120 in the cloud server 140 on the second device 110, according to an embodiment of the present disclosure.

In operation 540, the second device 110 may detect the third device 120 using short-range communication. The second device 110 is a device registered in the cloud server 140 with respect to a user account by the first device 100. The second device 110 may detect the third device 120 to register the third device 120 newly added to the home in the cloud server 140.

In an example embodiment, the second device 110 may receive a Wi-Fi beacon broadcasted from the third device 120 when the short-range communication is Wi-Fi. The third device 120 may generate a soft Wi-Fi AP to obtain information needed to be registered in the cloud server 140.

The Wi-Fi beacon broadcasted from the third device 120 may include information used for connection to the third device 120 using Wi-Fi communication. For example, the Wi-Fi beacon may include an SSID of the third device 120.

The second device 110 may detect the third device 120 based on information included in the received Wi-Fi beacon. For example, the second device 110 may confirm the SSID of the third device 120 included in the Wi-Fi beacon and detect that the third device 120 is the device newly added to the home.

Also, in an example embodiment, the second device 110 may transmit notification information indicating that the third device 120 is detected to the first device 100 in response to the third device 120 being detected. The notification information indicating that the third device 120 is detected may be transmitted to the first device 100 and displayed on a screen of the first device 100. The first device 100 may display the notification information on the screen of the first device 100 in order to obtain user consent to register the third device 120 in the cloud server 140.

The first device 100 may receive a user input. In an example embodiment, the first device 100 may receive a user input to register the third device 120 in the cloud server 140. The second device 110 may receive the user input from the first device 100.

The second device 110 may be connected to the third device 120 based on the received user input. For example, if the short-range communication is Wi-Fi, the second device 110 may be connected to the third device 120 by accessing the soft Wi-Fi AP generated by the third device 120. The second device 110 may be connected to the third device 120 according to a user input corresponding to the user consent on the registration of the third device 120 in the cloud server 140 and may register the third device 120 in the cloud server 140.

In operation 550, the second device 110 may request the cloud server 140 for a second authentication code used for registering the third device 120 in the cloud server 140 in response to the third device 120 being detected. The second authentication code is a code different from the first authentication code used for registering the second device 110 in the cloud server 140 and is a code used for registering the third device 120 in the cloud server 140.

Since the second device 110 does not obtain user account information from the first device 100, the second device 110 cannot log in to the account server 150 and request the second authentication code. Instead, the second device 110 may request the second authentication code from the cloud server 140.

The cloud server 140 may request the second authentication code from the account server 150 upon the request of the second device 110. The account server 150 may generate the second authentication code upon the request of the cloud server 140. The generated second authentication code may be matched to a user account of the second device 110 for the account server 150. The second authentication code may be used to authenticate that a user of the third device 120 is the same as a user of the second device 110. Furthermore, the second authentication code may be used to cause the third device 120 to be registered in the cloud server 140 with respect to the same user account as that of the second device 110.

A separate user account log-in is not required when the cloud server 140 requests the second authentication code from the account server 150. The cloud server 140 may request the second authentication code from the account server 150 with a secure and trusted channel. In addition, the cloud server 140 may obtain a second authentication code from the account server 150.

Also, in an example embodiment, the second device 110 may transmit access information for accessing the AP 130 that the second device 110 is currently accessing to the third device 120 in response to the third device 120 being detected. Since the third device 120 needs to first be connected to the Internet in order to be registered in the cloud server 140, the second device 110 may transmit the access information for accessing the AP 130 to the third device 120.

The access information for accessing the AP 130 may include an SSID and a password of a Wi-Fi AP. The access information transmitted to the third device 120 may be used by the third device 120 to access the AP 130.

In operation 560, the second device 110 may receive the second authentication code from the cloud server 140. The second device 110 may receive the second authentication code matched to a user account of the second device 110 from the cloud server 140.

In operation 570, the second device 110 may transmit the received second authentication code and the connection address information of the cloud server 140 to the third device 120. The connection address information of the cloud server 140 may be connection address information of the cloud server 140 in which the second device 110 is registered with respect to a user account. The third device 120 may access the cloud server 140 using the connection address information of the cloud server 140 and may request the cloud server 140 for registration using the second authentication code.

The second device 110 transmits the second authentication code received from the cloud server 140 instead of transmitting the user account information to the third device 120 so that the third device 120 may be registered in the cloud server 140 with respect to the same user account as that of the second device 110.

The second authentication code provided to the third device 120 may be transmitted from the third device 120 to the cloud server 140. A user account matched to the second authentication code is identified by the cloud server 140 so that the third device 120 may be registered in the cloud server 140 with respect to the same user account as that of the second device 110.

Since the second authentication code matched to the user account is generated by the account server 150 and provided to the cloud server 140, the cloud server 140 may identify the user account matched to the authentication code by comparing the authentication code received from the account server 150 with the authentication code received from the third device 120.

As described above, the second device 110 automatically provides the third device 120 with access information for accessing the AP 130 and information used for the registration in the cloud server 140 so that the third device 120 may be registered in the cloud server 140 with respect to the same user account as that of the second device 110. In the above-described process, only user's minimum consent is required, and user convenience may be increased.

Furthermore, since the second device 110 is registered in the cloud server 140 with respect to the same user account as that of the first device 100, all of the first device 100, the second device 110, and the third device 120 may be registered in the cloud server 140 with respect to an identical user account. The first device 100, the second device 110, and the third device 120 may be integrally managed through the cloud server 140. For example, a plurality of devices registered in the cloud server 140 with respect to an identical user account may be mutually controlled.

FIG. 6 is a flowchart of a method of registering the third device 120 in the cloud server 140 on the second device 110 by using an authentication code obtained from the cloud server 140, according to an embodiment of the present disclosure.

In operation S605, the second device 110 may detect the third device 120 newly added to the home. In operation S610, the second device 110 may transmit notification information indicating that the third device 120 is detected to the first device 100 in response to the third device 120 being detected.

In operation S615, the first device 100 may display the notification information indicating that the third device 120 is detected on a screen of the first device 100. In operation S620, the first device 100 may receive a user input. The first device 100 may receive a user input to register the third device 120 in the cloud server 140. A user input corresponding to user consent may be a user's minimum intervention required to register the third device 120 in the cloud server 140.

In operation S625, the first device 100 may transmit the user input to the second device 110. In operation S630, the second device 110 may be connected to the third device 120 based on the received user input.

In operation S635, the second device 110 may request an authentication code from the cloud server 140. Since the second device 110 is previously registered in the cloud server 140, the second device 110 may request the authentication code from the cloud server 140 without having to log in to the cloud server 140. The authentication code is used for registering the third device 120 in the cloud server 140.

In operation S640, the cloud server 140 may request the authentication code from the account server 150. The cloud server 140 may request the second authentication code from the account server 150 with a secure and trusted channel.

In operation S645, the account server 150 may generate an authentication code matched to a user account. The account server 150 may generate and provide the authentication code matched to a user account, thereby not providing the user account information directly. The account server 150 may manage a plurality of devices having an identical user account using the authentication code.

In operation S650, the account server 150 may provide the cloud server 140 with the authentication code matched to the user account. In operation S655, the cloud server 140 may transmit the authentication code received from the account server 150 to the second device 110.

In operation S660, the second device 110 may transmit the received authentication code, the connection address information of the cloud server 140, and the access information for accessing the AP 130 to the third device 120. However, the access information for accessing the AP 130 may not necessarily be transmitted.

In operation S665, the third device 120 may access the AP 130 using the access information for accessing the AP 130. The third device 120 may be connected to the Internet through the AP 130. If the access information for accessing the AP 130 has not been transmitted, operation S665 may be omitted.

In operation S670, the third device 120 may request the cloud server 140 for registration. The third device 120 may access the cloud server 140 using the received connection address information of the cloud server 140. Also, the third device 120 may request the cloud server 140 for registration by transmitting the received authentication code and an identification value of the third device 120 to the cloud server 140.

In operation S675, the cloud server 140 may identify a user account matched to the received authentication code. The cloud server 140 may confirm that the third device 120 is managed by the same user account as that of the second device 110 by identifying the user account matched to the received authentication code.

In operation S680, the cloud server 140 may register the third device 110 with respect to the identified user account. The cloud server 140 may integrally manage the second device 110 and the third device 120 by registering the second device 110 and the third device 120 with respect to an identical user account. Furthermore, the first device 100 registered with respect to the same user account as that of the second device 110 may be managed together with the second device 110 and the third device 120.

In operation S685, the cloud server 140 may transmit notification information indicating that the third device 120 is registered in the cloud server 140, to the first device 100.

According to the above-described operations, the second device 110 registered in the cloud server 140 by the first device 100 may continue to cause the third device 120 to be registered in the cloud server 140. Since registration of a plurality of devices in the cloud server 140 is automatically performed, actions required by the user to form a network including the plurality of devices may be reduced. As a result, user convenience may be increased.

Figure 7:
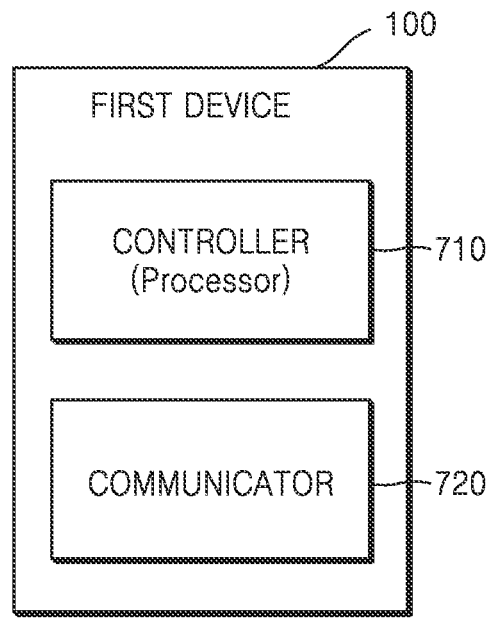
FIGS. 7 and 8 are block diagrams each showing a configuration of a first device according to various embodiments of the present disclosure.
Figure 8:
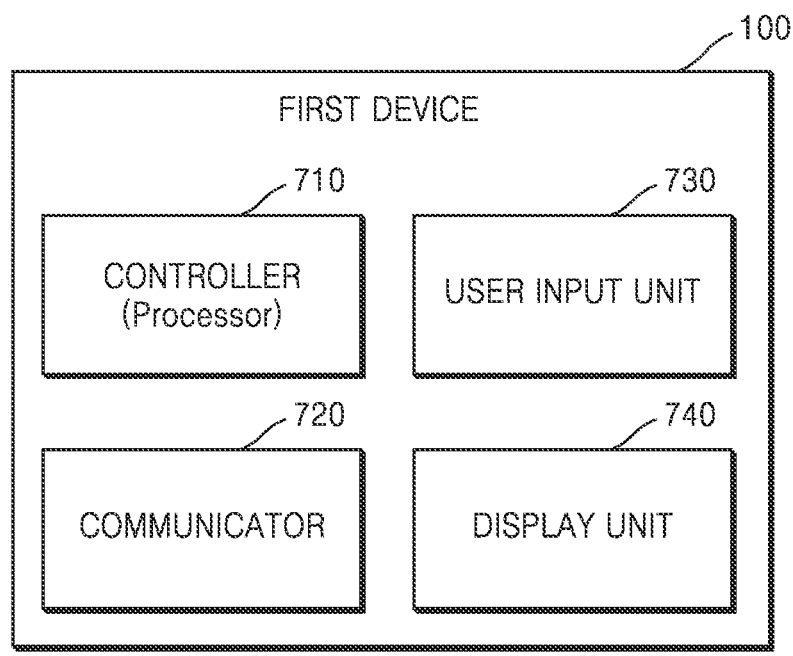

FIGS. 7 and 8 are block diagrams each showing a configuration of the first device 100, according to various embodiments of the present disclosure.

Referring to FIG. 7, the first device 100 according to an example embodiment may include a controller 710 and a communicator 720. However, not all components shown in FIG. 7 are necessary components of the first device 100. That is, the first device 100 may include more or less components than the components shown in FIG. 7.

Referring to FIG. 8, the first device 100 according to an example embodiment may further include a user input unit 730 and a display unit 740 in addition to the controller 710 and the communicator 720.

Also, the first device 100 may include a memory (not shown). The memory is hardware that stores various data processed in the first device 100. The memory may store applications, drivers, and the like to be driven by the first device 100. The memory may store at least one program executable by the first device 100.

The memory may include at least one type of storage medium from among memory of a flash memory type, a hard disk type, a multimedia card micro type or a card type (for example, secure digital (SD) or extreme digital (XD) memory), random access memory (RAM), static RAM (static RAM), read-only memory (ROM), electrically erasable programmable ROM (EEPROM), programmable ROM (PROM), magnetic memory, a magnetic disk, or an optical disk.

The communicator 720 may include at least one communication interface for transmitting and receiving data with other devices. For example, the communicator 720 may include one or more components for communicating with other devices, the AP 130, the account server 150, and the cloud server 140. The communicator 720 may be connected to other devices via wireless communication such as Wi-Fi and short-range wireless communication, and may transmit and receive data. Alternatively, the communicator 720 may exchange data with another device by being connected to the device through wired communication using a data communication cable.

The user input unit 730 is a device for a user to input data for controlling the first device 100. For example, the user input unit 730 may include a keypad, a touch pad (a contact capacitance type, a pressure resistance film type, an infrared sensing type, an ultrasonic transmission type in a surface, an integral tension measurement type, a piezoelectric effect type, etc.), a jog wheel, a jog switch and the like, but is not limited thereto. The user input unit 730 may receive a user input to register the second device 110 in the cloud server 140.

The display unit 740 displays and outputs information that is processed in the first device 100. For example, the display unit 740 may display notification information indicating that the second device 110 is detected, and may display a graphical user interface for receiving the user input.

The controller 710 may generally control the first device 100. For example, the controller 710 may generally control the communicator 720, the user input unit 730, the display unit 740, and the like by executing programs stored in the memory in the first device 100. The controller 710 may perform operations of the first device 100 in FIGS. 1, 2, 3, and 4 by executing the programs stored in the memory.

The controller 710 may be implemented by one or more processors. For example, the processor may be implemented as an array of logic gates, and may be implemented as a combination of a universal microprocessor and a memory in which a program executable in the microprocessor is stored.

The controller 710 may detect the second device 110 using short-range communication by controlling the communicator 720. The controller 710 may detect the second device 110 to register the second device 110 newly added to the home in the cloud server 140.

In an example embodiment, the controller 710 may receive a Wi-Fi beacon broadcasted from the second device 110 when the short-range communication is Wi-Fi. The Wi-Fi beacon broadcasted from the second device 110 may include information used for connection to the second device 110 using Wi-Fi communication. The controller 710 may detect the second device 110 based on information included in the received Wi-Fi beacon.

The controller 710 may display notification information indicating that the second device 110 is detected on a screen of the display unit 740 in response to the second device 110 being detected. The controller 710 may display the notification information on the screen of the display unit 740 in order to obtain user consent to register the second device 110 in the cloud server 140.

The controller 710 may receive a user input through the user input unit 730. In an example embodiment, the controller 710 may receive a user input to register the second device 110 in the cloud server 140. Furthermore, for example, the controller 710 may receive access information for accessing the AP 130 and a user input for inputting user account information.

The controller 710 may be connected to the second device 110 based on the user input. The controller 710 may be connected to the second device 110 according to a user input corresponding to the user consent on the registration of the second device 110 in the cloud server 140 and may register the second device 110 in the cloud server 140.

The controller 710 may request an authentication code used for registering the second device 110 in the cloud server 140 from the account server 150 in response to the second device 110 being detected. The controller 710 may receive the user account information through the user input unit 730 and may log in to the account server 150 using the received user account information. The controller 710 logged in to the account server 150 with respect to a user account may request an authentication code from the account server 150.

Furthermore, in an example embodiment, the controller 710 may transmit access information for accessing the AP 130 within a proximity from the first device 100 to the second device 110 in response to the second device 110 being detected. Since the second device 110 needs to first be connected to the Internet in order to be registered in the cloud server 140, the controller 710 may transmit the access information to the second device 110 for accessing the AP 130 within the proximity from the first device 100.

The controller 170 may receive an authentication code from the account server 150. The controller 710 may receive the authentication code matched to the user account of the first device 100 from the account server 150.

The controller 710 may transmit the received authentication code and connection address information of the cloud server 140 to the second device 110. The connection address information of the cloud server 140 may be connection address information of the cloud server 140 in which the first device 100 is registered with respect to a user account. The second device 110 may access the cloud server 140 using address access information of the cloud server 140 and may request the cloud server 140 for registration using the authentication code.

The controller 710 transmits the authentication code received from the account server 150 instead of transmitting the user account information to the second device 110 so that the second device 110 may be registered in the cloud server 140 with respect to the same user account as that of the first device 100.

In an example embodiment, the controller 710 may receive notification information indicating that the second device 110 is registered from the cloud server 140. Also, the controller 710 may display the received notification information on the screen of the display unit 740. A user may confirm that the second device 110 is registered in the cloud server 140 through the displayed notification information.

Figure 9:
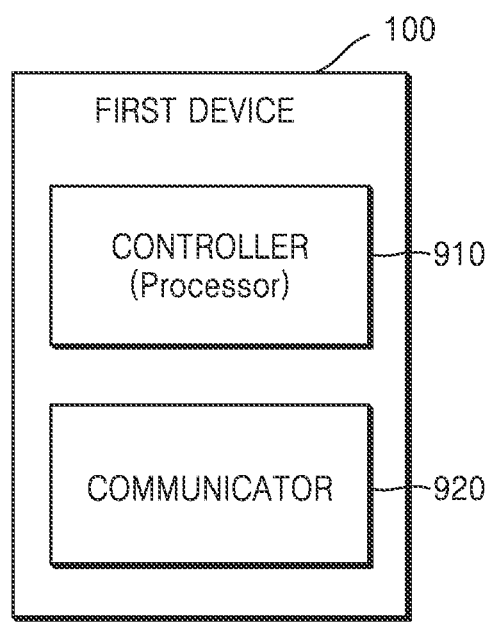
FIG. 9 is a block diagram showing a configuration of a second device according to an embodiment of the present disclosure.

FIG. 9 is a block diagram showing a configuration of the second device 110, according to an embodiment of the present disclosure.

Referring to FIG. 9, the second device 110 may include a controller 910 and a communicator 920. However, not all components shown in FIG. 9 are necessary components of the second device 110. That is, the second device 110 may include more or less components than the components shown in FIG. 9.

For example, the second device 110 may further include a memory (not shown). The memory is hardware that stores various data processed in the second device 110. The memory may store applications, drivers, and the like to be driven by the second device 110. The memory may store at least one program executable by the second device 110.

The communicator 920 may include at least one communication interface for transmitting and receiving data with other devices. For example, the communicator 920 may include one or more components for communicating with other devices, the AP 130, the account server 150, and the cloud server 140. The communicator 920 may be connected to other devices via wireless communication such as Wi-Fi and short-range wireless communication, and may transmit and receive data. Alternatively, the communicator 920 may exchange data with another device by being connected to the device through wired communication using a data communication cable.

The controller 910 may generally control the second device 110. For example, the controller 910 may generally control the communicator 920 and the like by executing programs stored in the memory in the second device 110. The controller 910 may perform operations of the second device 110 in FIGS. 5A, 5B, 6, and 7 by executing the programs stored in the memory.

The controller 910 may be implemented by one or more processors. For example, the processor may be implemented as an array of logic gates, and may be implemented as a combination of a universal microprocessor and a memory in which a program executable in the microprocessor is stored.

The controller 910 may be connected to the first device 100 using short-range communication by controlling the communicator 920. In an example embodiment, if the short-range communication is Wi-Fi, the controller 910 may generate a soft Wi-Fi AP to obtain information for requesting registration from the cloud server 140.

The controller 910 may receive a first authentication code used for registering the second device 110 in the cloud server 140 and connection address information of the cloud server 140 from the first device 100. The connection address information of the cloud server 140 may be information on an access address of the cloud server 140 in which the first device 100 is registered with respect to a user account.

Also, the controller 910 may receive access information from the first device 100 for accessing the AP 130 within a proximity from the first device 100. Since the second device 110 needs to first be connected to the Internet in order to be registered in the cloud server 140, the controller 910 may receive the access information for accessing the AP 130 within the proximity from the first device 100.

The controller 910 may access the AP 130 using the access information received from the first device 100. The controller 910 accesses the AP 130 through the communicator 920 so that the second device 110 may be connected to the Internet.

The controller 910 may request the cloud server 140 for registration using the received first authentication code and the connection address information of the cloud server 140. The controller 910 may access the cloud server 140 using the connection address information of the cloud server 140. In addition, the controller 910 may transmit the first authentication code to the cloud server 140. A user account matched to the first authentication code is identified by the cloud server 140 so that the second device 110 may be registered in the cloud server 140 with respect to the same user account as that of the first device 100.

The controller 910 may detect the third device 120 using short-range communication by controlling the communicator 920. The third device 120 may be a device newly added to the home.

In an example embodiment, the controller 910 may receive a Wi-Fi beacon broadcasted from the third device 120 when the short-range communication is Wi-Fi. The Wi-Fi beacon broadcasted from the third device 120 may include information used for connection to the third device 120 using Wi-Fi communication. The controller 910 may detect the third device 120 based on information included in the received Wi-Fi beacon.

Also, in an example embodiment, the controller 910 may transmit notification information indicating that the third device 120 is detected to the first device 100 in response to the third device 120 being detected. The notification information indicating that the third device 120 is detected may be transmitted to the first device 100 and displayed on a screen of the first device 100. The first device 100 may display the notification information on the screen of the first device 100 in order to obtain user consent to register the third device 120 in the cloud server 140.

The first device 100 may receive a user input. In an example embodiment, the first device 100 may receive a user input to register the third device 120 in the cloud server 140. The controller 910 may receive the user input from the first device 100. The controller 910 may be connected to the third device 120 based on the received user input.

The controller 910 may request a second authentication code used for registering the third device 120 in the cloud server 140 from the cloud server 140 in response to the third device 120 being detected. The second authentication code is a code different from the first authentication code used for registering the second device 110 in the cloud server 140 and is a code used for registering the third device 120 in the cloud server 140.

Also, the controller 910 may transmit access information for accessing the AP 130 that the second device 110 is currently accessing to the third device 120 in response to the third device 120 being detected. Since the third device 120 needs to first be connected to the Internet in order to be registered in the cloud server 140, the controller 910 may transmit the access information for accessing the AP 130 to the third device 120. The access information transmitted to the third device 120 may be used by the third device 120 to access the AP 130.

The controller 190 may receive the second authentication code from the cloud server 140. The controller 910 may receive the second authentication code matched to a user account of the second device 110 from the cloud server 140.

The controller 910 may transmit the received second authentication code and the connection address information of the cloud server 140 to the third device 120. The connection address information of the cloud server 140 may be connection address information of the cloud server 140 in which the second device 110 is registered with respect to a user account. The third device 120 may access the cloud server 140 using the connection address information of the cloud server 140 and may request the cloud server 140 for registration using the second authentication code.

A method of operation of the first device 100 and the second device 110 may be recorded in a non-transitory computer-readable recording medium having recorded thereon one or more programs including instructions for executing the method. Examples of the non-transitory computer-readable recording medium include magnetic media, such as a hard disc, a floppy disc, and magnetic tape; optical media, such as a compact disc-ROM (CD-ROM) and a digital versatile disc (DVD); magneto-optical media, such as floptical discs; ROM; RAM; and flash memory. Program commands may include, for example, high-level language code that can be executed by a computer using an interpreter, as well as machine language code made by a complier.

It should be understood that example embodiments described herein should be considered in a descriptive sense only and not for purposes of limitation. Descriptions of features or aspects within each example embodiment should typically be considered as available for other similar features or aspects in other example embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method, performed by a first device, of registering a second device in a cloud server, the method comprising:
   detecting the second device;
   requesting an account server for an authentication code matched to a user account of the first device for the account server and used for registering the second device in the cloud server, in response to the second device being detected;
   receiving the authentication code from the account server; and
   transmitting the authentication code and connection address information of the cloud server to the second device,
   wherein the authentication code matched to the user account and user account information is transmitted from the account server to the cloud server,
   wherein, by the cloud server, the user account of the first device, matched to the authentication code, is identified based on a comparison of the authentication code received from the account server with the authentication code received from the second device,
   wherein the cloud server provides a cloud service that stores, downloads, and uploads data,
   wherein the connection address information includes information on an address of the cloud server in which the first device is registered to match the user account, and
   wherein the user account matched to the authentication code is identified by the cloud server so that the second device is registered in the cloud server with respect to the user account.

2. The method of claim 1, further comprising:
   transmitting access information to the second device for accessing an access point (AP) within a proximity from the first device, in response to the second device being detected,
   wherein the access information transmitted to the second device is used by the second device to access the AP.

3. The method of claim 2, wherein, the access information for accessing the AP comprises a service set identifier (SSID) and a password of a Wi-Fi AP.

4. The method of claim 1, wherein the requesting comprises:
   logging in to the account server; and
   requesting the account server for the authentication code.

5. The method of claim 1,
   wherein the authentication code matched to the user account is generated by the account server and provided to the cloud server, and
   wherein the authentication code provided to the second device is transmitted from the second device to the cloud server.

6. The method of claim 1, further comprising:
   displaying notification information indicating that the second device is detected on a screen of the first device;
   receiving a user input; and
   connecting the second device to the first device based on the user input.

7. The method of claim 1,
   wherein the detecting the second device comprises detecting the second device by using short-range communication, and wherein the short-range communication comprises at least one of wireless fidelity (Wi-Fi), Bluetooth (BT), ZigBee, Wi-Fi direct (WFD), ultra-wideband (UWB), BT low energy (BLE), or near field communication (NFC).

8. The method of claim 1, wherein the detecting comprises:
receiving a Wi-Fi beacon broadcast from the second device; and
detecting the second device based on information included in the received Wi-Fi beacon.

9. The method of claim 1, further comprising:
receiving, from the cloud server, notification information indicating that the second device is registered; and
displaying the received notification information on a screen.

10. A non-transitory computer-readable recording medium having recorded thereon one or more programs including instructions that, when executed by a processor of a first device, cause the first device to register a second device in a cloud server by:
detecting the second device;
requesting an account server for an authentication code matched to a user account of the first device for the account server and used for registering the second device in the cloud server, in response to the second device being detected;
receiving the authentication code from the account server; and
transmitting the authentication code and connection address information of the cloud server to the second device,
wherein the authentication code matched to the user account and user account information is transmitted from the account server to the cloud server,
wherein, by the cloud server, the user account of the first device, matched to the authentication code, is identified based on a comparison of the authentication code received from the account server with the authentication code received from the second device,
wherein the cloud server provides a cloud service that stores, downloads, and uploads data,
wherein the connection address information includes information on an address of the cloud server in which the first device is registered to match the user account, and
wherein the user account matched to the authentication code is identified by the cloud server so that the second device is registered in the cloud server with respect to the user account.

11. A first device comprising:
a memory configured to store at least one program including instructions;
at least one communication interface configured to exchange data with at least one of a second device, an account server, or a cloud server; and
a processor, when executing the instructions, configured to control the first device to register the second device in the cloud server by:
detecting the second device,
requesting an account server for an authentication code matched to a user account of the first device for the account server and used for registering the second device in the cloud server, in response to the second device being detected,
receiving the authentication code from the account server, and
transmitting the authentication code and connection address information of the cloud server to the second device,
wherein the authentication code matched to the user account and the user account information is transmitted from the account server to the cloud server,
wherein, by the cloud server, the user account of the first device, matched to the authentication code, is identified based on a comparison of the authentication code received from the account server with the authentication code received from the second device,
wherein the cloud server provides a cloud service that stores, downloads, and uploads data,
wherein the connection address information includes information on an address of the cloud server in which the first device is registered to match the user account, and
wherein the user account matched to the authentication code is identified by the cloud server so that the second device is registered in the cloud server with respect to the user account.

12. The first device of claim 11,
wherein the processor, when executing the instructions, is further configured to register the second device in the cloud server by transmitting access information to the second device for accessing an access point (AP) within a proximity from the first device in response to the second device being detected, and
wherein the access information transmitted to the second device is used by the second device to access the AP.

13. The first device of claim 11, wherein the requesting further comprises:
logging in to the account server; and
requesting the account server for the authentication code.

14. The first device of claim 11,
wherein the authentication code matched to the user account is generated by the account server and provided to the cloud server, and
wherein the authentication code provided to the second device is transmitted from the second device to the cloud server.

15. The first device of claim 11, wherein the processor, when executing the instructions, is further configured to register the second device in the cloud server by:
displaying notification information indicating that the second device is detected on a screen,
receiving a user input, and
connecting the second device to the first device based on the user input.

16. The first device of claim 11,
wherein the detecting the second device comprises detecting the second device by using short-range communication, and
wherein the short-range communication comprises at least one of wireless fidelity (Wi-Fi), Bluetooth (BT), ZigBee, Wi-Fi direct (WFD), ultra-wideband (UWB), BT low energy (BLE), or near field communication (NFC).

17. The first device of claim 11, wherein the detecting comprises:
receiving a Wi-Fi beacon broadcast from the second device, and
detecting the second device based on information included in the received Wi-Fi beacon.

18. The first device of claim 11, wherein the processor, when executing the instructions, is further configured to register the second device in the cloud server by:

receiving, from the cloud server, notification information indicating that the second device is registered, and displaying the received notification information on a screen.

19. The method of claim 1, wherein the authentication code matched to the user account is used to register the second device in the cloud server with respect to a same user account as the user account of the first device.

\* \* \* \* \*